Figure 12:
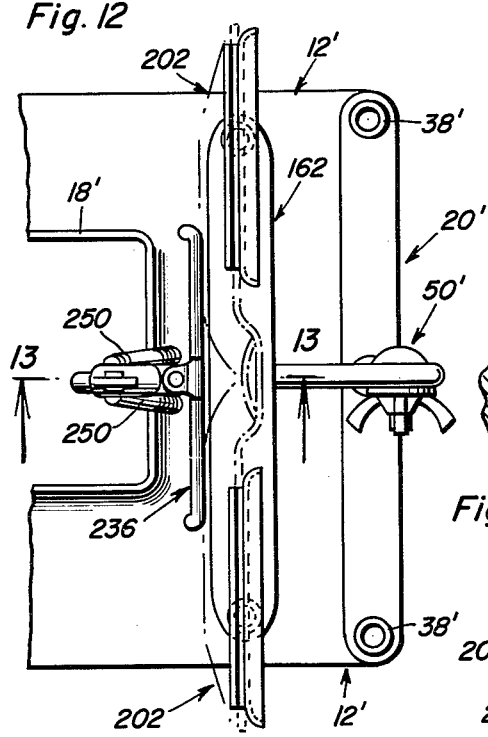

July 30, 1963
ROBERT U. MITSUYASU
3,099,102
NOTE AND NOTE BOOK HOLDER
Filed Jan. 23, 1962
4 Sheets-Sheet 1
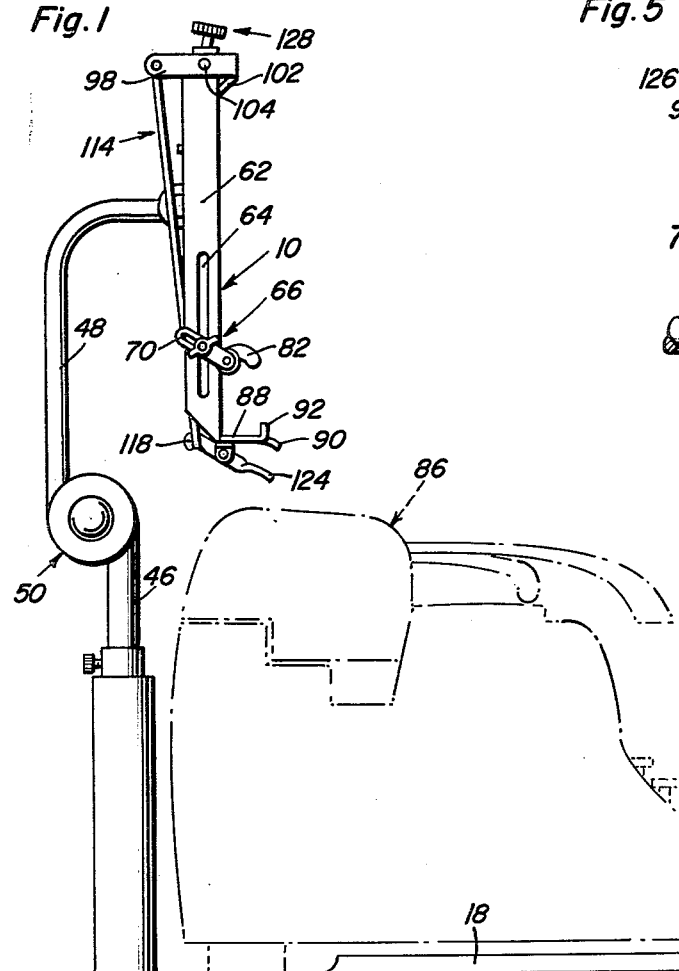
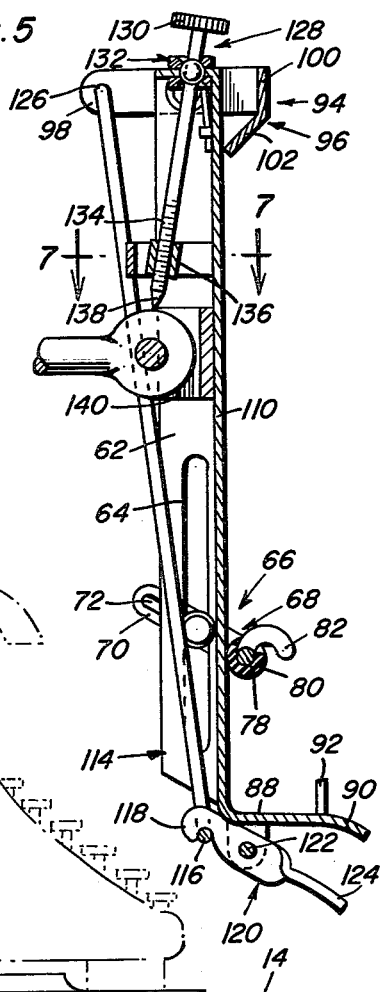
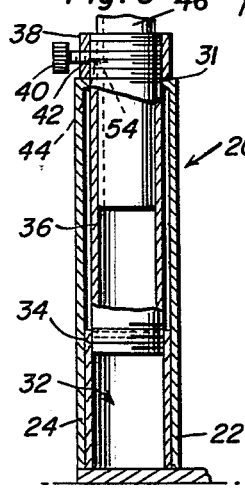
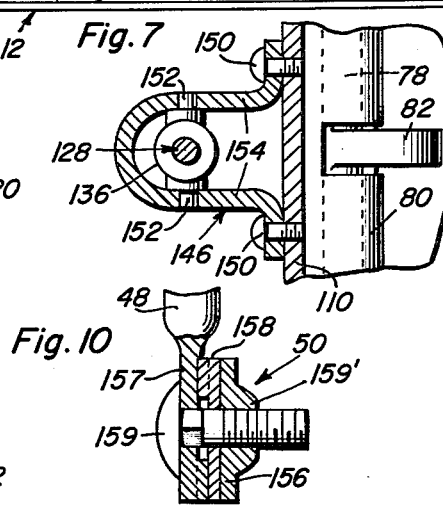
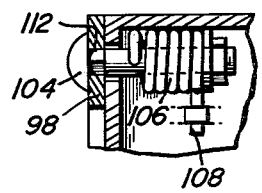
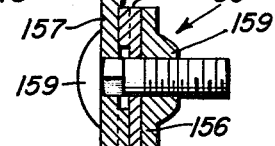
Robert U. Mitsuyasu
INVENTOR.
BY *Clarence A O'Brien*
*and Harvey B. Jacobson*
Attorneys July 30, 1963  ROBERT U. MITSUYASU  3,099,102
NOTE AND NOTE BOOK HOLDER
Filed Jan. 23, 1962  4 Sheets-Sheet 2
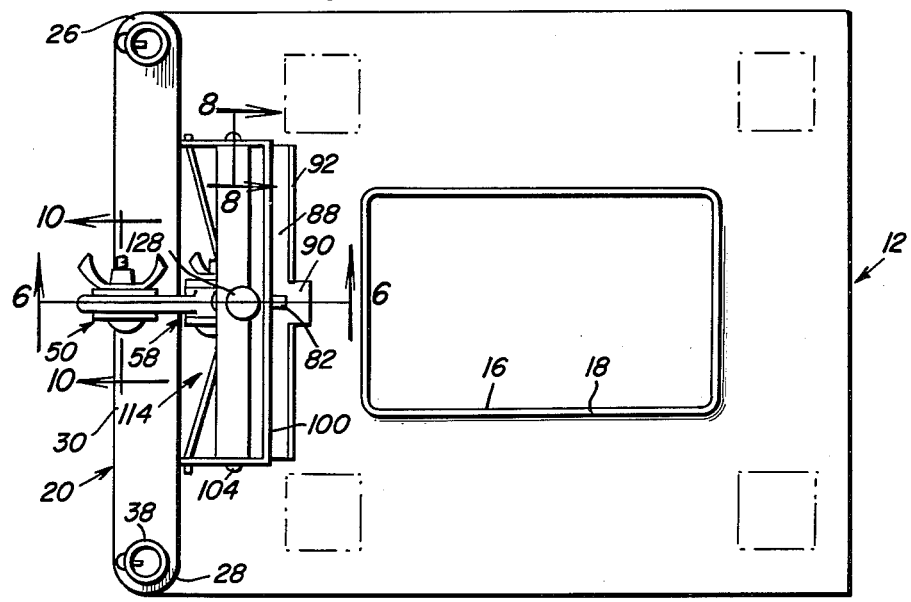
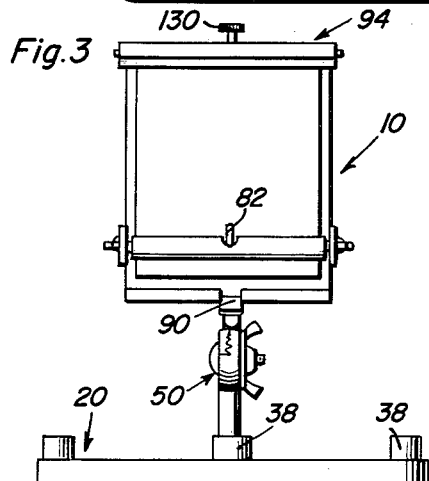
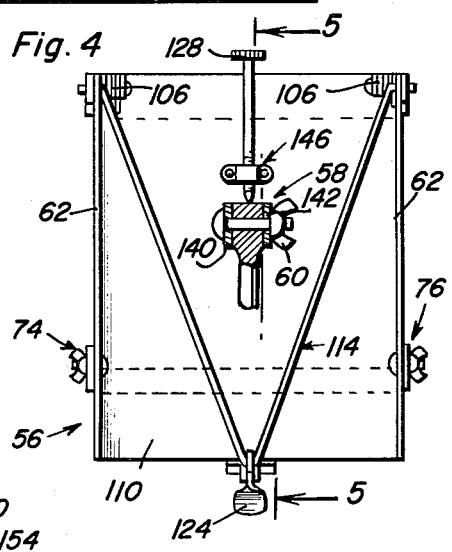
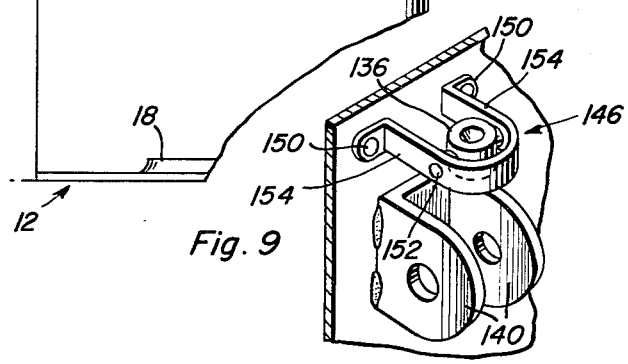
Robert U. Mitsuyasu
INVENTOR.

July 30, 1963  ROBERT U. MITSUYASU  3,099,102
NOTE AND NOTE BOOK HOLDER
Filed Jan. 23, 1962  4 Sheets-Sheet 3
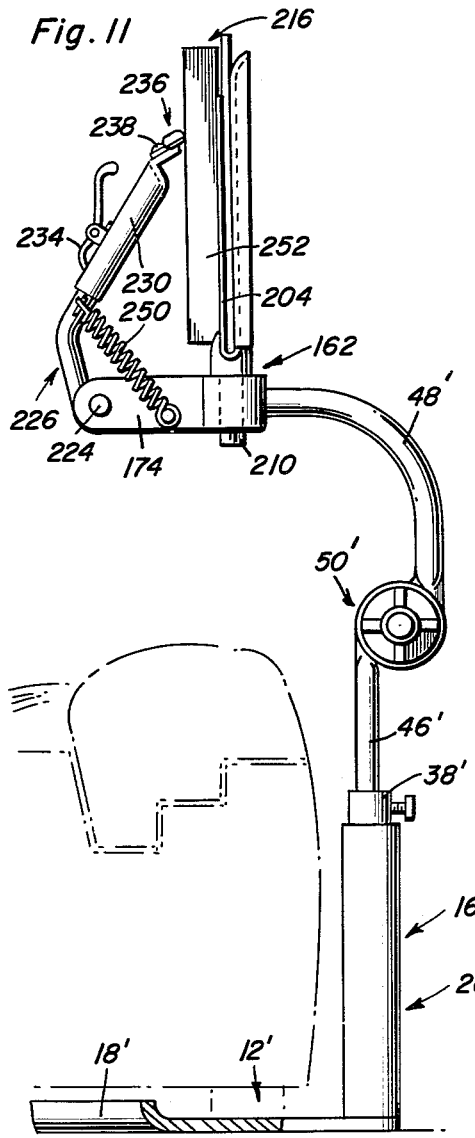
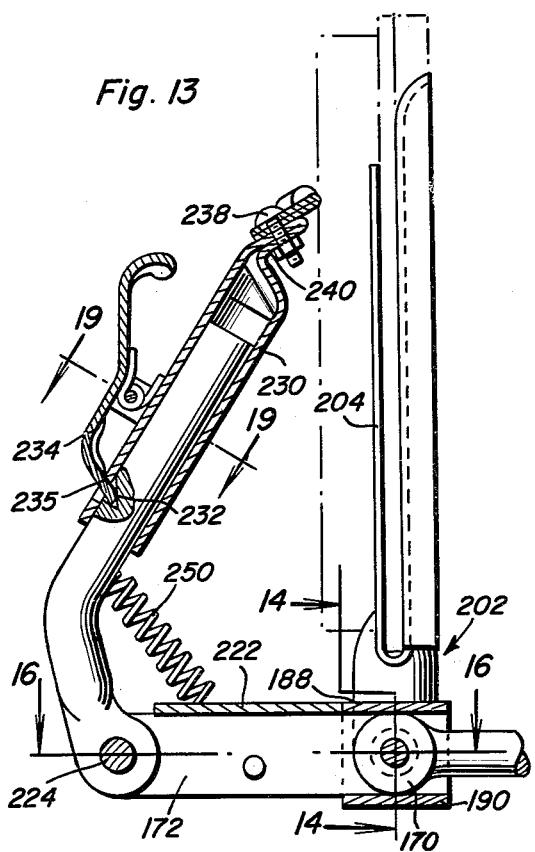
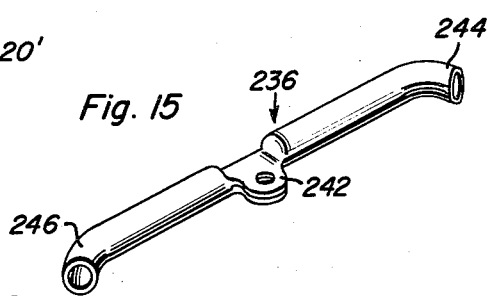
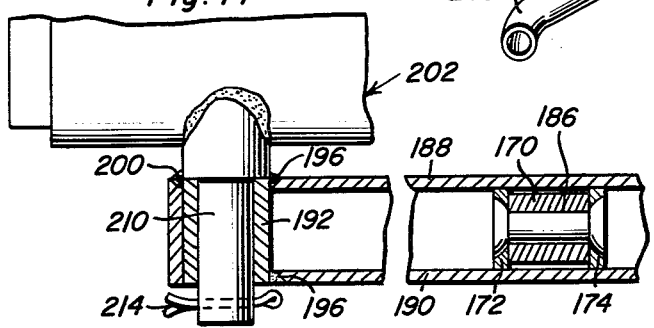
Robert U. Mitsuyasu
INVENTOR.

July 30, 1963  ROBERT U. MITSUYASU  3,099,102
NOTE AND NOTE BOOK HOLDER
Filed Jan. 23, 1962  4 Sheets-Sheet 4

Robert U. Mitsuyasu
INVENTOR.

3,099,102
NOTE AND NOTE BOOK HOLDER
Robert U. Mitsuyasu, 91—710 Makule Road,
Ewa Beach, Hawaii
Filed Jan. 23, 1962, Ser. No. 168,096
17 Claims. (Cl. 45—82)

This invention relates to a novel and useful note and note book holder and more specifically to a note or copy holder for an office machine operator which includes a generally horizontally disposed and substantially planar base portion adapted to be disposed on a generally horizontally disposed supporting surface and to have an office machine positioned thereof for support of the office machine from the supporting surface and securement of the base portion to the supporting surface. The copy holder includes an upright support and means is provided for securing the lower end of the upright support to the rear of the base portion for vertical positioning relative to the base portion. The upright support includes upper and lower sections and means is provided for securing the lower end of the upper section to the upper end of the lower section for pivotal movement about a horizontally disposed axis extending transversely of the base portion and of the upper and lower portions of the standard. An inclined copy holding table is pivotally secured to the upper portion of the upper section for movement about a horizontally disposed axis extending transversely of the base portion and the copy holding table includes means adapted to support copy material in an inclined position facing forwardly of the base portion.

The lower section is of a length to enable it to be vertically adjusted relative to the base portion so as to be adapted to position the upper section above the uppermost portion of the office machine disposed on the base portion whereby the upper portion may be pivoted forwardly at its free end without interference from the office machine adjacent the copy holder. In this manner, a typist or adding machine operator may readily support copy material in a most advantageous position immediately behind the office machine he is operating.

It may thus be seen that the copy holder of the instant invention is capable of performing the main object of this invention which is to support a piece of copy material in the most advantageous position relative to a piece of office machinery for viewing by the operator of the office machine.

A further object of this invention, in accordance with the immediately preceding object, is to provide a copy holder which will be capable of supporting a "hard back" book in a manner whereby the binding along the rear edge of the book will not be damaged when the front cover and rear panels of the book are substantially coplanar.

Another object of this invention, in accordance with the preceding objects, is to provide a means on the copy holding table of the copy holder specifically adapted to clampingly engage the front and rear cover panels of a hard back book independently of additional means which is provided for holding the book open at a given page.

Still another object of this invention is to provide readily releasable means for supporting flexible sheets of copy material from the upper marginal edge portion of the copy table.

A further object of this invention is to provide a copy holder which will be capable of holding one or more pieces of copy on the copy holding table at one time.

Still another object of this invention is to provide a copy holder in accordance with the preceding objects which may be readily placed in and removed from an operative position to support pieces of copy immediately above and to the rear of conventional types of portable office machinery.

A further object to be specifically enumerated herein is to provide a copy holder in accordance with the preceding objects which will conform to conventional forms of manufacture, be of simple construction and easy to use so as to provide a device that will be economically feasible, long lasting and relatively trouble free in operation.

Figure 16:
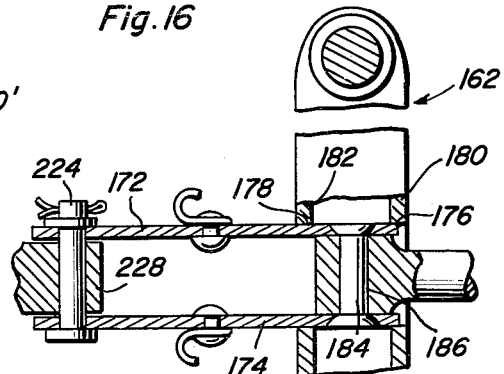
Figure 17:
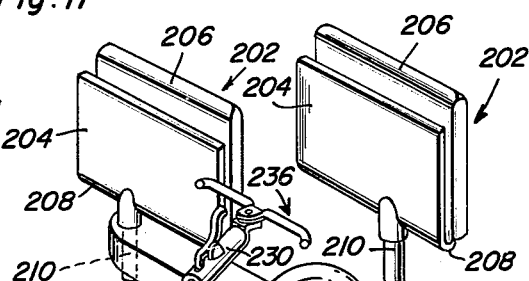
Figure 18:
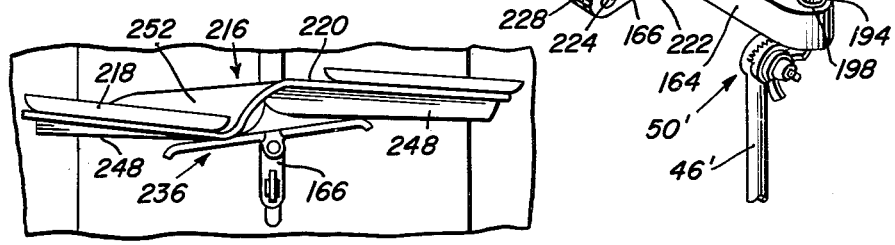
Figure 19:
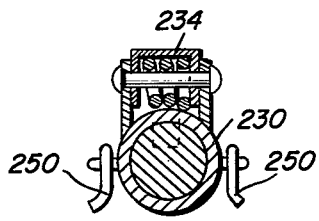

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the copy holder;
FIGURE 2 is a top plan view of the copy holder;
FIGURE 3 is a front elevational view of the copy holder on somewhat of a reduced scale;
FIGURE 4 is a fragmentary rear elevational view of the copy holder;
FIGURE 5 is an enlarged vertical sectional view taken substantially upon the plane indicated by the section line 5—5 of FIGURE 4;
FIGURE 6 is an enlarged fragmentary vertical sectional view taken substantially upon the plane indicated by the section line 6—6 of FIGURE 2;
FIGURE 7 is an enlarged fragmentary horizontal sectional view taken substantially upon the plane indicated by the section line 7—7 of FIGURE 5;
FIGURE 8 is an enlarged fragmentary vertical sectional view taken substantially upon the plane indicated by the section line 8—8 of FIGURE 2;
FIGURE 9 is a fragmentary perspective view of the copy holding table of the copy holder illustrated in FIGURES 1–8;
FIGURE 10 is a fragmentary vertical sectional view taken substantially upon the plane indicated by the section line 10—10 of FIGURE 2;
FIGURE 11 is a fragmentary side elevational view of a modified form of copy holder with parts broken away and shown in section;
FIGURE 12 is a fragmentary top plan view of the modified form of copy holder;
FIGURE 13 is an enlarged vertical sectional view taken substantially upon the plane indicated by the section line 13—13 of FIGURE 12;
FIGURE 14 is a fragmentary vertical sectional view taken substantially upon the plane indicated by the section line 14—14 of FIGURE 13;
FIGURE 15 is a perspective view of the page holding bar of the modified form of copy holder;
FIGURE 16 is a fragmentary horizontal sectional view taken substantially upon a plane indicated by the section line 16—16 of FIGURE 13;
FIGURE 17 is a fragmentary perspective view of the copy table shown with one of the book leaf holding means attached;
FIGURE 18 is a fragmentary top plan view of the modified form of copy holder; and
FIGURE 19 is an enlarged sectional view taken substantially upon a plane indicated by the section line 19—19 of FIGURE 13.

Referring now more specifically to the drawings the numeral 10 generally designates the copy holder of the instant invention. The copy holder 10 includes a generally horizontally disposed plate-like base portion generally referred to by the reference numeral 12 which is disposed on a suitable generally horizontally disposed supporting surface 14. The base portion 12 has a centrally disposed opening 16 formed therein which is defined by peripheral upstanding laterally struck flange portions 18.

An outer upstanding housing generally referred to by the reference numeral 20 and including front and rear walls 22 and 24 and curved opposite end walls 26 and 28 is secured to the rear marginal edge portion of the base portion 12 in any convenient manner. The outer housing 20 includes an upper wall 30 which has a plurality of openings 31 formed therein. An inner housing generally referred to by the reference numeral 32 is disposed within the lower end of the outer housing 20 and has a plurality of internally threaded openings 34 formed therein. A standpipe 36 is provided for each of the openings 34 and the openings 31 and 34 are alined in order that the lower end of each standpipe may be threadedly engaged in the corresponding opening 34 with the upper end thereof snugly received through the corresponding opening 31.

A stop collar 38 is threadedly secured to the upper end of each of the standpipes 36 and includes a setscrew 40 which is threadedly engaged in a threaded bore 42 formed through the stop collar 38. The inner end of each setscrew 40 is received through a bore 44 formed in the end portion of the corresponding standpipe 36 and may be utilized for a purpose to be hereinafter more fully set forth.

It may be seen from FIGURE 3 of the drawings that three standpipes 36 and stop collars 38 are provided and that the copy holder 10 includes an upright support generally referred to by the reference numeral 45. The upright support 45 includes a lower section 46 and an upper section 48 and it will be noted that the lower end of the upper section 48 is pivotally secured to the upper end of the lower section 46 by means of a friction-type pivotal connection generally referred to by the reference numeral 50 which may be adjusted by manipulation of the wing nut 52 thereof. Accordingly, it may be seen that the upper section 48 may be pivoted relative to the lower section 46 and retained in adjusted positions as desired. Additionally, it will be observed that the lower section 46 is provided with a plurality of apertures 54 in a se-40 may be engaged to adjustably position the lower selected one of which the innermost end of the setscrew tion 46 relative to the outer housing 20.

A support table assembly generally referred to by the reference numeral 56 is pivotally secured to the upper end of the upper section 48 by means of a friction-type pivotal connection generally referred to by the reference numeral 58 which may be adjusted by means of wing nut 60. Accordingly, it may be seen that the support table assembly 56 may be pivoted relative to the upper end of the upper section 48 and retained in adjusted pivoted positions by means of the pivot connection 58.

The support table assembly 56 includes a pair of rearwardly directed opposite side flanges 62 and each of the side flanges 62 is provided with an upstanding slot 64. A bail assembly generally referred to by the reference numeral 66 includes a generally U-shaped bail member referred to in general by the reference numeral 68 including a pair of leg members 70 each provided with a slot 72 and a bight portion which is secured between corresponding ends of the leg members 70. Friction-type pivotal connections generally referred to by the reference numerals 74 and 76 pivotally secure the leg members 70 of the bail member 68 to the side flanges 62 and are disposed in the slots 64 whereby the bail member 68 may be slid longitudinally of the side flanges 62 and may be adjustably positioned about an axis extending between the leg members 70 and generally paralleling the bight portion 78. It will also be noted that the pivotal connections 74 and 76 are received through the slots 72 whereby the bight portion 78 and the covering 80 carried thereby may be moved laterally of the support table assembly 56. Further, it will be noted that the center of the bail 68 includes a forwardly projecting and downwardly opening hook portion 82 which may be manipulated by the operator of the office machine generally referred to by the reference numeral 86 to properly position the bail member 68 as desired.

It will be noted that the lower end of the support table assembly 56 includes a forwardly projecting support flange 88 and that its free end is forwardly and downwardly directed as at 90. Additionally, it may be seen that the support flange 88 is provided with an upstanding retaining flange 92 for preventing copy material supported by the support table assembly 56 from slipping off the forward end of the support flange 88.

As can best be seen from FIGURE 5 of the drawings, the upper marginal portion of the support table assembly 56 has a clamp assembly generally referred to by the reference numeral 94 mounted thereon. The clamp assembly 94 includes a generally U-shaped clamping bail referred to in general by the reference numeral 96 and the bail 96 includes a pair of opposite leg members 98 which are interconnected by means of a bight portion 100 which extends across the front of the upper marginal edge portion of the support table assembly 56 and terminates at its lower end in a backturned gripping flange 102. The leg members 98 are pivotally secured to the upper ends of the side flanges 62 by means of pivot fasteners 104 and each of the pivot fasteners 104 has a coil spring 106 disposed thereabout having one end 108 secured to the support table panel 110 of the support table assembly 56 and the other end secured to the pivot fastener 104. It will be noted that the pivot fastener 104 is provided with a noncircular shank portion 112 by which the corresponding leg member 98 is secured thereto for rotation therewith. Accordingly, the springs 106 normally resiliently urge the gripping flange portion 102 into frictional engagement with the support table panel 110.

A generally V-shaped operating member referred to in general by the reference numeral 114 has its apex portion 116 engaged with a hooked end portion 118 of an operating lever generally referred to by the reference numeral 120 pivotally supported from the lower end of the support table assembly 56 by means of a pivot fastener 122. The other end of the lever 120 remote from the hooked end 118 thereof is provided with a free end portion 124 which may be manipulated to move the gripping flange 102 out of engagement with the support table panel 110. The free ends of the V-shaped member 114 are pivotally secured to the ends of the leg members 98 remote from the bight portion 100 as at 126 and accordingly, it will be noted that upward movement of the free end portion 124 will effect a downward movement of the rear ends of the leg members 98 and thus movement of the gripping flange 102 away from the support table panel 110.

An adjusting screw generally referred to by the reference numeral 128 is provided with a knob 130 on its upper end and is swivelly supported from the upper end of the support table assembly 56 by means of a swivel connection generally referred to by the reference numeral 132. The lower end of the adjustment screw 128 is externally threaded as at 134 and is threadedly engaged with a pivotally mounted and internally threaded sleeve member 136. The lower terminal end portion of the adjusting screw 128 is provided with a conical point 138 disposed for engagement with the upper free end of the upper section 48 which is pivotally secured between the furcations 140 and 142 of the pivotal connection 58. Accordingly, it may be seen that the support table assembly 56 may be adjustably positioned by means of the adjusting screw 128 but that the adjusting screw 128 includes a lost motion connection with the upper section 48 whereby the lower end of the support table assembly 56 may always be swung rearwardly away from the adjusted position of the support table assembly 56 defined by the adjusting screw 128.

From FIGURE 7 of the drawings it will be noted that a generally U-shaped mounting member 146 is secured to the support table panel 110 by means of fasteners 150 and that the internally threaded sleeve member 136 is provided with stub axle portions 152 rotatably supported by means of the legs 154 of the mounting member 146.

The friction type pivotal connection generally referred to by the reference numeral 50 includes a pair of washer-like end portions 156 and 157 carried by the upper end of the lower section 46 and the lower end of the upper section 48 respectively. The confronting faces of the washer-like end portions 156 and 157 are provided with circumferentially disposed and radially extending teeth 158 which are interlockingly engaged with each other by means of a fastener 159 removably secured to the washer-like end portions 156 and 158 by means of a nut 159′.

With attention now directed to FIGURES 11 through 19 of the drawings there will be seen a modified form of copy holder generally referred to by the reference numeral 160 which is similar in many respects to the copy holder 10 and whose parts which are similar to corresponding parts of the copy holder 10 have been prime numerals corresponding to the numerals given to those same parts of the copy holder 10.

The copy table of the copy holder 160 is generally referred to by the reference numeral 162 and is substantially T-shaped in cross-section including a first long leg 164 which extends transversely of the base portion 12′ and a second short leg 166 which extends longitudinally of the base portion 12′. The upper end of the upper section 48′ is curved forwardly and terminates in an apertured washer-like end portion 170. The opposite sides of the short leg 166 are designated by the reference numerals 172 and 174 and have corresponding end portions secured within the midportion of the leg 164 in any convenient manner. A passageway defined by registered openings 176 and 178 formed in the opposite sides 180 and 182 in the leg 164 is formed through the midportion of the leg 164 and the adjacent end of the leg 166 is secured within this passageway. A pivot pin 184 extends between the ends of the sides 174 and 172 received within the leg 164 and the forwardmost upper end portion of the upper section 48′ is provided with a bore 186 which rotatably receives a pivot pin 184. In this manner, the support table 162 is pivotally secured to the upper end of the upper section 48′.

The leg 164 includes upper and lower walls 188 and 190. The upper and lower surfaces of the portions of the sides 172 and 174 disposed within the long leg 164 are disposed in surface-to-surface contacting relation with the lower and upper surfaces of the upper and lower walls 188 and 190 respectively and it will be noted that the bore 186 is formed through the washer-like end portion 170 carried by the upper end of the upper section 48′.

Upstanding cylindrical sleeves 192 and 194 are secured through aligned pairs of apertures 196 and 198 formed in corresponding opposite ends of the upper and lower walls 188 and 190 in any convenient manner such as by welding 200. The support table 162 is provided with a pair of upwardly opening channel defining book-leaf supporting members generally referred to by the reference numerals 202. Each of the book-leaf supporting members 202 includes an upwardly opening and generally U-shaped member having a pair of legs 204 and 206 interconnected at their lower ends by means of a curved bight portion 208. Additionally, each book-leaf supporting member 202 also includes a depending pivot pin 210 which is provided with a diametric bore 212 on its lower end. Each of the pivot pins 210 is rotatably journaled in the corresponding sleeve and is secured therein by means of a retaining pin 214 secured through its diametric bore 212.

Each of the book-leaf supporting members 202 is adapted to snugly and embracingly support the lower marginal edge portion of the leaf of a book. From FIGURE 18 of the drawings it may be seen that the book generally referred to by the reference numeral 216 has its front and rear leaves 218 and 220 respectively supported by means of the book-leaf supporting members 202 carried by the opposite ends of the leg 164.

The ends of the sides 172 and 174 remote from the leg 164 project beyond the corresponding end of the top wall 222 of the leg 166 and have a pivot pin 224 secured therebetween. An elongated bail arm generally referred to by the reference numeral 226 includes a journal portion 228 on one end which is rotatably supported by means of the pivot pin 224 and a sleeve section 230 is telescopically engaged with the other end. The bail arm 226 includes a plurality of longitudinally spaced notches 232 on its end remote from the journal portion 228 and the sleeve 230 includes a spring mounted retaining lever 234 having an end portion 235 which is receivable in a selected one of the notches 232. In this manner, the sleeve 230 may be secured in adjusted positions of extension relative to the bail arm 226. The end of the sleeve 230 remote from the journal portion 226 has a bail bar assembly generally referred to by the reference numeral 236 pivotally secured thereto by means of a pivot fastener 238 which is secured through an apertured end portion 240 of the sleeve 230 and an apertured mounting lug 242 carried by the midportion of the bail bar assembly 236. The bail bar assembly 236 includes curved end portions 244 and 246 which are adapted to curve outwardly away from the pages 248 of the book 216.

A pair of expansion springs 250 are secured between the leg 166 and the bail arm 226 at points spaced from the pivot pin 224 and the expansion springs 250 normally resiliently urge the bail bar assembly 236 into frictional engagement with the pages 248 of the book 216 supported by the book-leaf supporting members 202.

From a comparison of FIGURES 1 and 11 it will be noted that the same base portions may be utilized in the construction of both copy holders 10 and 160. Additionally, while each of the copy holders 10 and 160 has been illustrated and described as including a single upright support, the outer housings 20 and 20′ are each provided with three stop collars and accordingly, it may be seen that each of the copy holders 10 and 160 may include a pair of upright supports in addition to or in lieu of the single upright support provided.

In operation of the copy holder 160, the front and rear leaves of a book may be properly positioned in the book-leaf supporting members 202. Then, the book may be opened to the correct page and the bail bar assembly 236 may be utilized to retain the book 216 open at that page. It will be noted from FIGURE 18 of the drawings that as the book 216 is opened to different front and rear portions of the book that the book-leaf supporting members 202 will pivot relative to the leg 164 in a manner that will enable the back 252 of the book 216 to remain at substantially right angles to the group of pages 248 which are larger in number. In this manner, damage to the back of the book will be lessened.

It may be observed that each of the copy holders 10 and 160 may be readily constructed of a minimum number of readily available parts which have been constructed in conventional manners and accordingly, that the copy holders 10 and 160 may be produced and sold at a relatively low cost.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A copy holder for an office machine operator comprising a horizontally disposed base portion adapted to be disposed on a generally horizontally disposed supporting surface and to have an office machine positioned thereon for support of said office machine from said supporting surface and securement of said base portion to said supporting surface, an upright support, means securing the lower end of said upright support to the rear of said base portion for vertical positioning relative to said base portion, said upright support including upstanding upper and lower sections, means pivotally securing the lower end of said upper section to the upper end of said lower section for pivotal movement about a horizontally disposed axis extending transversely of said base portion, an inclined copy holding table pivotally secured to the upper portion of said upper section for movement about a horizontally disposed axis extending transversely of said base portion, said copy holding table including means adapted to support copy material in an inclined position facing forwardly of said base portion.

2. A copy holder for an office machine operator comprising a horizontally disposed base portion adapted to be disposed on a generally horizontally disposed supporting surface and to have an office machine positioned thereon for support of said office machine from said supporting surface and securement of said base portion to said supporting surface, an upright support, means securing the lower end of said upright support to the rear of said base portion for vertical positioning relative to said base portion, said upright support including upstanding upper and lower sections, means pivotally securing the lower end of said upper section to the upper end of said lower section for pivotal movement about a horizontally disposed axis extending transversely of said base portion, an inclined copy holding table pivotally secured to the upper portion of said upper section for movement about a horizontally disposed axis extending transversely of said base portion, said copy holding table including means adapted to support copy material in an inclined position facing forwardly of said base portion, the first-mentioned securing means including means mounting said lower section for vertical adjustment relative to said base portion and means for retaining said lower section in vertically adjusted positions so as to enable said lower section to be adapted to position said upper section above the uppermost portion of said office machine disposed on said base portion and to thereby enable said upper section to have its upper free end swung forwardly over said machine without the lower end portion of said upper section striking said machine.

3. A copy holder for an office machine operator comprising an upright support, means carried by the lower end of said support adapted to mount said support in upstanding position relative to a generally horizontally disposed supporting surface on which an office machine is disposed and to the rear of said machine, said upright support including upstanding upper and lower sections, means pivotally securing the lower end of said upper section to the upper end of said lower section for pivotal movement about a horizontally disposed axis extending transversely of said base portion, an inclined copy holding table pivotally secured to the upper portion of said upper section for movement about a horizontally disposed axis extending transversely of said base portion, said copy holding table including means adapted to support copy material in an inclined position facing forwardly of said base portion.

4. A copy holder for an office machine operator comprising an upright support, means carried by the lower end of said support adapted to mount said support in upstanding position relative to a generally horizontally disposed supporting surface on which an office machine is disposed and to the rear of said machine, said upright support including upstanding upper and lower sections, means pivotally securing the lower end of said upper section to the upper end of said lower section for pivotal movement about a horizontally disposed axis extending transversely of said base portion, an inclined copy holding table pivotally secured to the upper portion of said upper section for movement about a horizontally disposed axis extending transversely of said base portion, said copy holding table including means adapted to support copy material in an inclined position facing forwardly of said base portion, the first-mentioned securing means including means mounting said lower section for vertical adjustment relative to said base portion and means for retaining said lower section in vertically adjusted positions so as to enable said lower section to be adapted to position said upper section above the uppermost portion of said office machine disposed on said base portion and to thereby enable said upper section to have its upper free end swung forwardly over said machine without the lower end portion of said upper section striking said machine.

5. The combination of claim 2 wherein said copy holding table extends transversely of said base portion and includes means defining upwardly opening channel defining means adapted to receive the lower edge portions of the cover and back leaves of a book.

6. The combination of claim 5 wherein said channel defining means includes a pair of upwardly opening spaced apart channel members each adapted to support the corresponding leaf by embracing the lower edge portion thereof.

7. The combination of claim 6 wherein said copy holding table includes a movably mounted bail adapted to firmly hold the pages of a book in overlying relation to the inner surface of the cover and back leaves of a book cover.

8. The combination of claim 2 including means for adjustably positioning said copy holding table in adjusted rotated positions relative to said upper section of said upright support.

9. The combination of claim 8 wherein said adjustable positioning means includes a lost motion connection with said upper section.

10. The combination of claim 2 including friction means for retaining said upper and lower sections in adjusted rotated positions relative to each other.

11. The combination of claim 2 including friction means for retaining said copy holding table in adjusted rotated positions relative to said upper section.

12. The combination of claim 11 including friction means for retaining said upper and lower sections in adjusted rotated positions relative to each other.

13. The combination of claim 12 wherein said friction means are each adjustable.

14. The combination of claim 2 wherein said copy holding table includes clamp means operatively associated with the upper marginal edge portion of said holding table for clamping a piece of copy to said table.

15. The combination of claim 14 wherein said clamp means includes means normally resiliently urging said clamp means into clamping engagement with said upper marginal edge portion.

16. The combination of claim 15 wherein said clamp means includes manually operable release means carried by the lower marginal edge portion of said copy holding table.

17. The combination of claim 2 wherein said lower section is of a length to enable it to be vertically adjusted wherein said copy holding table extends transversely of said base portion and includes means defining upwardly opening channel defining means adapted to receive the lower edge portions of the cover and back leaves of a book, said channel defining means including a pair of upwardly opening spaced apart channel members each adapted to support the corresponding leaf by embracing the lower edge portion thereof.

References Cited in the file of this patent
UNITED STATES PATENTS

| | | |
|---|---|---|
| 2,236,133 | Croninger et al. | Mar. 25, 1941 |
| 2,826,858 | Simpkins | Mar. 18, 1958 |
| 2,959,886 | Lopez | Nov. 15, 1960 |